April 16, 1963   R. M. POWERS   3,086,116
APPARATUS FOR DETERMINING RADIOACTIVE MATERIAL RATIOS
Filed March 24, 1959
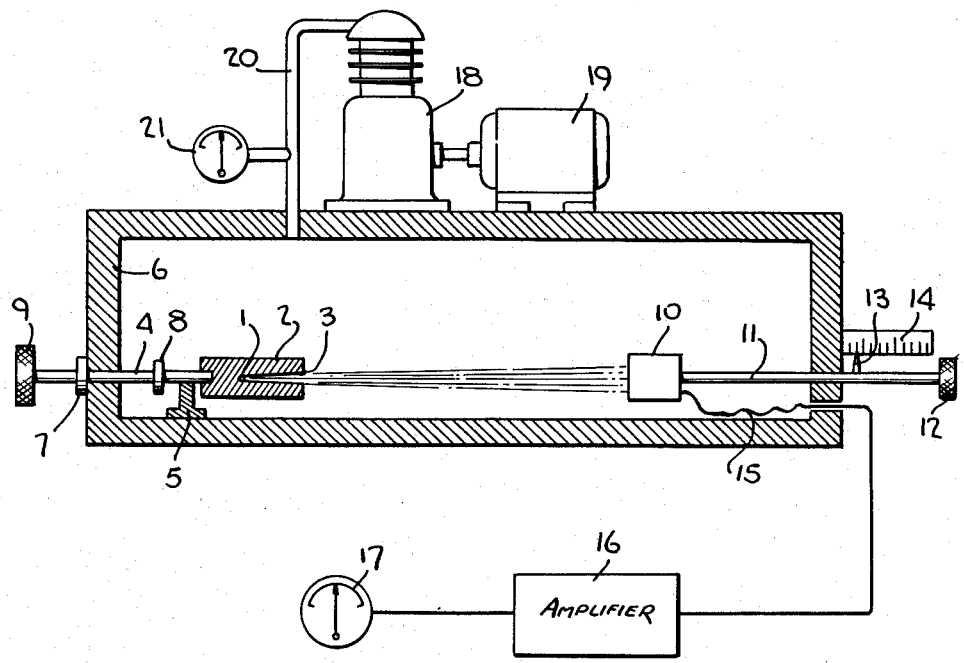
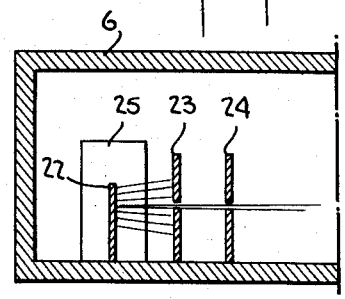
INVENTOR.
RICHARD M. POWERS
BY
*Kenyon & Kenyon*
ATTORNEYS 3,086,116
APPARATUS FOR DETERMINING RADIOACTIVE MATERIAL RATIOS
Richard M. Powers, Cold Spring Harbor, N.Y., assignor, by mesne assignments, to Sylvania Electric Products Inc., a corporation of Delaware
Filed Mar. 24, 1959, Ser. No. 801,566
3 Claims. (Cl. 250—83)

This invention relates to a process and apparatus for rapidly determining the percentages of different radioactive materials in a mixture.

It is frequently necessary to determine as rapidly as possible and with reasonable accuracy the percentage of one or more radioactive materials in a mixture of such materials. This is especially true, for example, where there is a mixture of two isotopes of uranium such as U-238 and the fissionable isotope U-235. In the natural state about .7% of uranium is in the form of U-235. For nuclear power devices a greater percentage of U-235 is required and is obtained by an expensive purification, or enrichment, process, resulting in a mixture that may contain 90% or more of U-235. Once uranium of high enrichment is obtained, it is undesirable thereafter to mix it with less enriched material and dangerous to gather too much of the enriched material together. By means of the present invention the enrichment of a sample may be quickly determined without destroying the sample.

The invention is based upon the known fact that the distance that α-particles travel through air after having been emitted by different radioactive materials depends primarily upon the material and that this range of travel differs even between isotopes of the same element. For example, α-particles emitted from the isotope U-235 have a range at normal atmospheric pressure of about 1.26", while the range of α-particles emitted from the isotope U-238 is about 1.06" at the same atmospheric pressure.

According to the present invention a sample of the material to be analyzed is placed in a shielded enclosed chamber and the atmospheric pressure in the chamber is reduced to a fraction of normal atmospheric pressure. By virtue of this fact, the range of α-particles emitted from radioactive isotopes in the mixture is correspondingly increased. A scintillation detector is placed within the chamber so as to be actuated by α-particles emitted from the mixture and to generate electrical signals, and at least two comparison measurements are then made of these signals. One of the measurements is made under conditions which permit α-particles from at least one of the components of the mixture to actuate the scintillation detector and a second measurement is made under conditions at which α-particles from at least one additional radioactive component of the mixture may be measured. These conditions are determined by the pressure in the chamber and by the distance between the scintillation detector and the sample of the mixture.

The invention will be further described with reference to the drawing in which:

FIG. 1 shows a cross sectional view of apparatus for carrying out the process of the invention, part of this apparatus being shown in electrical block form; and FIG. 2 shows a modification of the sample holder and collimator of FIG. 1.

In FIG. 1, a sample 1 of the mixture to be analyzed is placed in a holder 2 which may be, for example, a lead container having a channel 3 of restricted diameter to serve as a collimator of α-particles emanating from the sample 1. This holder 2 is supported by a rod 4 and a stand 5 in an enclosed radioactively shielded chamber 6. This chamber is preferably also made of lead to exclude ambient radioactive emanations that might affect the measurements. In the embodiment shown, the rod 4 is provided with a pair of collars 7 and 8 to permit the sample 1 to be moved readily between two fixed locations by means of a handle 9.

Within the chamber 6 and opposite the sample 1 is a scintillation detector 10 mounted on a second movable rod 11 provided with a handle 12 and a pointer 13. The pointer 13 cooperates with a scale 14 to furnish indications of the location of the scintillation detector 10 within the chamber 6. A cable 15 leads from the scintillation detector 10 to an amplifier 16 that may be part of an α-particle counter for registering, on the face of a meter or other indicator 17, the amount of α-particle-impingements on the detector 10. Such a counter is commercially available at the present time and need not be described in great detail.

An exhaust pump 18 operated by an electrical motor 19 is connected to the chamber 6 by means of a piece of tubing 20. The purpose of the exhaust pump 18 is to reduce the atmospheric pressure within the chamber in accordance with the desired conditions of measurement. A low-pressure, or vacuum, gauge 21 is connected to the tubing 20 to measure the pressure within the chamber 6.

In order to facilitate an understanding of the invention it will be assumed that the mixture to be analyzed consists in part of the isotope U-235 and in part of the isotope U-238 and that there are no other radioactive elements present in the mixture. At normal atmospheric pressure, α-particles emitted from the isotope U-235 will travel only about 1.26" before being stopped. The reason for their stopping is that as each α-particle travels along it ionizes atoms of the medium through which it passes. In ionizing each successive atom the α-particle loses kinetic energy and thus slows down. As determined by the well known Bragg curve, as the α-particle slows down, the local ionization in its immediate vicinity increases, which has a cumulative effect in further slowing down the particle. As a result α-particles of a particular energy all come to a halt, by virtue of their total loss of kinetic energy, at almost the same distance from their source. Since the initial energy of an α-particle is a characteristic of the material from which it was emitted, all α-particles from a given isotope stop at substantially the same distance from their point of emission. In the case of the isotope U-235 it is known that practically all α-particles emitted thereby come to a halt within plus or minus .04" of the normal distance of 1.26" at normal atmospheric pressure (760 mm. of mercury at 15° C.). The corresponding range for α-particles emitted by the isotope U-235 is 1.06" plus or minus .03".

The range of these α-particles is directly dependent upon the number of molecules in their paths, which in turn is inversely proportional to the atmospheric pressure. By reducing the atmospheric pressure within the chamber 6 to 1/10 of its normal atmospheric pressure, the range of all α-particles is multiplied by a factor of 10. Therefore α-particles from the isotope U-235 would travel 12.6" plus or minus 0.4" while those from the isotope U-238 would travel 10.6" plus or minus 0.3", making a difference of about 2". By locating the detector 10 at a distance of approximately 12" from the sample 1, a measurement could be obtained of practically all α-particles emitted by the atoms of isotope U-235 in the mixture. Then by making a second measurement at a point 10" from the sample 1, the total α-particle count could be recorded on the meter 17. By comparing the two measurements thus made against measurements from known samples previously recorded, a measure of the ratio of the amounts of the two isotopes present in the sample could be obtained.

In order to facilitate such a measurement where it is known that the sample contains only two known isotopes mixed in an unknown ratio, the position of the detector 10 could be held fixed and the position of the sample 1 could be moved from one point to the other by sliding the rod 4 back and forth between the limits set by the two collars 7 and 8. Or, if desired, collars could be put on the rod 11 and the position of the sample 1 could be held fixed. As a further alternative the position of the sample 1 could be held constant and the rod 11 moved back and forth to positions indicated by the pointer 13 on the scale 14. This latter alternative might be particularly useful where the exact nature of the components of the mixture was not known or where more than two components were included in the mixture. As a final alternative, any combination of the foregoing alternative movements of the sample 1 and the detector 10 could be used.

In addition to making measurements based on the relative positions of the sample 1 and the detector 10, measurements could also be made based upon different atmospheric pressures within the chamber 6, keeping the locations of the sample 1 and the detector 10 constant. Thus, at 1/10 normal atmospheric pressure the α-particles from the isotope U–235 would have a range of about 12.6" and so the detector 10 could be located in a fixed position about 12" from the sample 1 and a first recording made of the meter. Then the atmospheric pressure in the chamber 6 could be further lowered by means of the exhaust pump 18 to a different setting as indicated by the vacuum gauge 21 so that the range of α-particles from the isotope U–238 would be over 12". The range of α-particles from the isotope U–235 would, at this reduced pressure, be even greater. The result of making a measurement at this reduced pressure would be that a total α-particle count would be obtained, just as if the detector 10 were moved closer to the sample 1 while the pressure were held constant. The readings to be obtained and compared with standards would depend upon the pressure-distance conditions under which the readings and standards were taken, and it would in theory make no difference whether the pressure or the distance were the variable.

One further factor in making the measurements is that α-particles tend to radiate in all directions. By having a small enough opening at the end of the channel 3 only those particles within a relatively small included angle can escape and reach the detector 10. If the sensitive area of the detector 10 is great enough to include all of the particles in this angle at all of the distances at which measurements are to be made, it is unnecessary to include an additional calculation factor based upon the distance between the sample 1 and the detector 10.

FIG. 2 shows a modification of the sample and collimator arrangement. One form of typical sample to be analyzed by the apparatus is a bar such as is indicated reference character 22. Another typical sample (not shown) is a container containing a radioactive solution or a radioactive sludge made from material of unknown enrichment. By testing such a sample, the radioactive material can be separated on the basis of its enrichment and handled accordingly.

In order to limit the solid angle over which α-particles are emitted from large samples such as bars and containers a collimator in the form of two spaced lead plates 23 and 24 may be used. Each of these plates has a small aperture to permit α-particles from a limited area of the large sample 22 to pass through. The sample may be inserted into the chamber 6 through a door 25 in the rear wall.

While the invention has been described with reference to a single embodiment of the apparatus it will be recognized by those skilled in the art that variant forms of apparatus may be used and that the true scope of the invention is determined by the following claims.

What is claimed is:

1. Measuring apparatus for determining the proportions of various α-particle producing substances present in a sample comprising a holder for said sample of radioactive material to be measured; an α-particle detector located with respect to said sample to receive α-particles therefrom; an enclosure for said sample and said detector; an exhaust pump connected to said enclosure to reduce the atmospheric pressure therein; an indicator connected to said detector to indicate the impingement of α-particles on said detector; and a second indicator to indicate the distance of said sample from said detector.

2. Measuring apparatus for determining the proportions of various α-particle producing substances present in a sample comprising a radioactively shielded enclosed chamber; a holder for said sample within said chamber; an α-particle detector within said chamber and spaced from said holder; an exhaust pump connected to said chamber to reduce the atmospheric pressure therein; an indicator connected to said detector to indicate the impingement of α-particles thereon; a linkage connected to said detector and extending through the wall of said chamber to vary the distance of said detector from said holder; and a scale to indicate the distance of said detector from said holder.

3. Measuring apparatus for determining the proportions of various α-particle producing substances present in a sample comprising a lead-shielded airtight enclosure; a holder for said sample within said enclosure; a connecting link extending through the wall of said enclosure and attached to said holder to vary the position thereof within said chamber; an α-particle detector within said chamber; an indicator connected to said detector to indicate the impingement of α-particles thereon, said detector being spaced apart within said chamber from said holder; and a second indicator to indicate movement of said holder within said chamber as a measure of the distance of said holder from said detector.

References Cited in the file of this patent

UNITED STATES PATENTS

| | | |
|---|---|---|
| 2,490,642 | Lipson | Dec. 6, 1949 |
| 2,761,976 | Obermaier et al. | Sept. 4, 1956 |
| 2,924,715 | Hendee et al. | Feb. 9, 1960 |
| 2,933,603 | De Yakimac | Apr. 19, 1960 |

OTHER REFERENCES

Detection of Charged Particles with Gas Scintillation Counters, by Nobles, R. A., from the Review of Scientific Instruments, vol. 27, No. 5, May 1956, pages 280 to 283.